United States Patent [19]
Leary et al.

[11] 4,110,560
[45] Aug. 29, 1978

[54] COMMUNICATION APPARATUS

[75] Inventors: Patrick John Leary, Waltham; Harry Leonard Shaffer, Lynnfield, both of Mass.

[73] Assignee: GTE Sylvania Incorporated, Stamford, Conn.

[21] Appl. No.: 854,463

[22] Filed: Nov. 23, 1977

[51] Int. Cl.² .............................................. H04M 1/00
[52] U.S. Cl. ............................... 179/1 VC; 178/58 A; 179/16 A
[58] Field of Search ........................... 178/58 A, 58 R; 179/15 R, 15 A, 16 R, 16 A, 16 B, 88, 89, 1 VC, 1 FS, 1 CN, 1 H, 37, 170 R, 170.2, 170.6

[56] References Cited
U.S. PATENT DOCUMENTS

| 3,794,763 | 2/1974 | Boudewijns et al. | 179/1 VC |
| 3,937,907 | 2/1976 | Campanella et al. | 179/170.2 |
| 4,009,356 | 2/1977 | Borysiewicz et al. | 179/170.2 |
| 4,027,114 | 5/1977 | Kahlbrock | 179/170.2 |

Primary Examiner—Thomas A. Robinson

Attorney, Agent, or Firm—Peter Xiarhos

[57] ABSTRACT

A half-duplex digitally-controlled telephone communication apparatus for permitting half-duplex communication between local and remote subscribers. Analog speech of one subscriber to be transmitted to the other subscriber is converted to a digital format, processed by real-time speech processing apparatus, stored in a delay buffer, and processed in modem apparatus for transmission to the other subscriber. In accordance with the present invention, the delay buffer provides a delay of a sufficient duration to compensate for inherent delays in the system in detecting the presence (or absence) of speech signals and serves to prevent the loss to the remote subscriber of portions of speech of the local subscriber, especially the onset of speech or rapid utterances of the local subscriber. The apparatus of the invention further includes apparatus for preventing the transfer of the communication channel or line from the local subscriber to the remote subscriber during normal pauses in the speech of the local subscriber.

15 Claims, 13 Drawing Figures

Fig. 1.

COMMUNICATION APPARATUS

BACKGROUND OF THE INVENTION

The present invention relates to communication apparatus and, more particularly, to a half-duplex digitally-controlled telephone communication apparatus.

There are many telephone communication systems in which it is desired for one subscriber to communicate with another subscriber using sampled voice data which is processed in real time in a digital format and transmitted over telephone lines via modem equipment and re-processed at the receiving end for use by the other subscriber. In half-duplex systems of this type it is a requirement that the modulated data originating at one subscriber location not be present on a telephone line simultaneously with modulated data originating at the other subscriber location so as to prevent the data on the line from being undesirably combined. In this latter situation, combined modulated data received by a demodulator would lead to an error rate higher than normally expected in a well-designed communication system and, when processed by a speech synthesizer, could result in a distorted version of the desired output, thereby rendering the communication channel deficient or impossible to use for speech communication. Consequently, in this type of system it is desirable that one speaker maintain control of the line for so long as he is speaking and relinquish the line to the other speaker only upon termination of his speech. It is further desirable and important that no part of the speech of either speaker be lost to the other, for example, due to delays in the system in detecting the onset of speech data, or that the line be undesirably switched from one speaker to the other during normal pauses as occur during normal conversation.

The present invention is directed to communication apparatus which satisfies the abovementioned requirements or criteria.

BRIEF SUMMARY OF THE INVENTION

In accordance with the present invention a communication apparatus is provided by which bidirectional communication may take place over a transmission network, such as a telephoonne network, and in which provision is made for preventing the loss of speech data to subscribers and for preventing undesirable switchovers of the communication channel during normal pauses in speech.

The communication apparatus in accordance with the invention includes a first, local source of digital data representative of speech and a second, remote source of digital data also representative of speech. It is between these two sources of data that bidirectional communication is able to take place over the transmission network. A real-time processing means is coupled to the first source of data and operates to detect and examine in real time the data from the first source and to produce an output signal when the data is determined to represent voice data as opposed to noise. A speech analysis means is coupled to the first source of data and operates to compress the data from the first source to a rate usable by a modulator means provided in the communication apparatus. A delay means is coupled to the speech analysis means and to the modulator means and operates to delay the data from the speech analysis means by a predetermined amount and to apply the delayed data to the modulator means. The modulator means thereupon operates to match the delayed data to the transmission network. The amount of delay provided by the delay means is selected in accordance with the invention to compensate for delays inherent in the detection of data by the real-time processing means.

The communication apparatus further includes a first switch means coupled to the modulator means and an output means coupled to the first switch means. The first switch means has a first operating state during which data from the modulator means may pass therethrough and a second operating state during which data from the modulator means may not pass therethrough. The output means is operative to apply data passing through the first switch means to the transmission network. The passage of data through the first switch means to the transmission network is accomplished in accordance with the invention under the control of a receiver means and a controller means coupled to the real-time processing means, to the receiver means and to the first switch means. The receiver means is adapted to examine data from the aforementioned second source of data and operates in the absence of digital data originating with the second source to produce an output signal.

The controller means operates in response to the output signals produced by the receiver means and the real-time processing means to cause the first switch means to operate in its first operating state thereby to allow data from the modulator means to be applied via the first switch means to the output means for application to the transmission network. The controller means is operative in accordance with the invention to cause the first switch means to operate in its first operating state for a period of time coincident with and also extending beyond the delay provided by the delay means by an additional amount. The controller means is further operative upon the cessation of data from the first source and the termination of the output signal from the real-time processing means to cause the first switch means to switch to its second operating state at the termination of the aforesaid period of time. The duration of the aforesaid period of time is selected in accordance with the invention to prevent the first switch means from switching to its second operating state during a pause in the speech data from the first source, specifically, a pause in the speech data corresponding to and representative of a normal pause in speech.

BRIEF DESCRIPTION OF THE DRAWING

Various objects, features and advantages of a half-duplex telephone communication apparatus in accordance with the present invention will be apparent from the following detailed description taken in conjunction with the accompanying drawing in which.

DETAILED DESCRIPTION OF THE INVENTION

Figure 1:
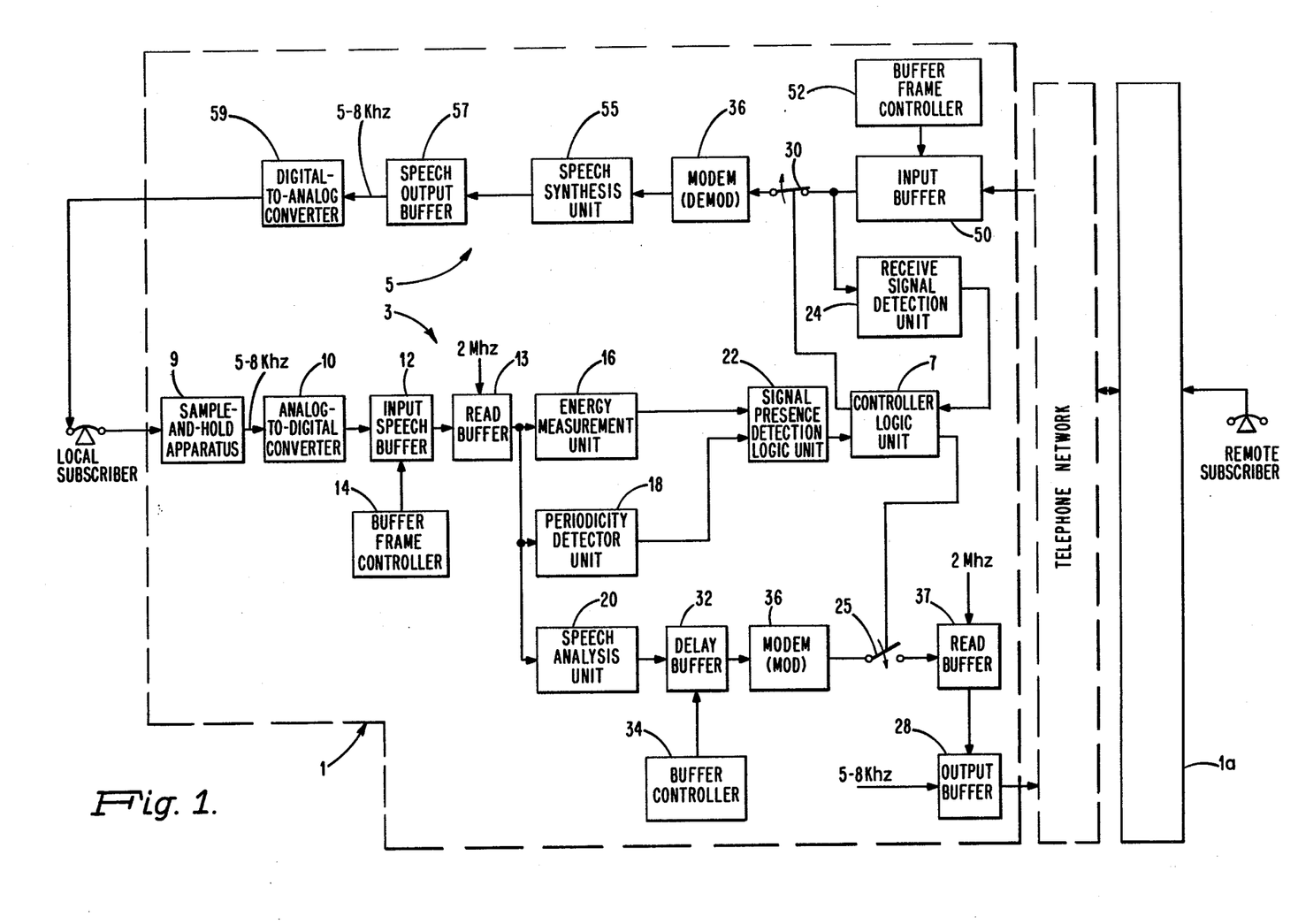
FIG. 1 is a block diagram of a half-duplex digitally-controlled telephone communication apparatus in accordance with the present invention.

Referring now to FIG. 1, there is shown a half-duplex digitally-controlled telephone communication apparatus 1 in accordance with the present invention. The communication apparatus 1 is employed to enable a subscriber at one location (e.g., a local subscriber) to communicate bidirectionally over a standard telephone network with a subscriber at another location (e.g., a remote subscriber). As indicated in FIG. 1, the remote subscriber at the other location is also provided with apparatus 1a of the same form as the apparatus 1 associated with the local subscriber to enable the remote subscriber to communicate bidirectionally in the same fashion as the local subscriber.

The communication apparatus 1 as shown in FIG. 1 generally includes a transmitter portion 3 by which speech data may be processed and transmitted to a remote subscriber, and a receiver portion 5 by which speech data may be received from the remote subscriber and processed for use by the local subscriber. The transmitter portion 3 and and the receiver portion 5 are operated in their respective transmit and receive modes under the control of a controller logic unit 7, shown in detail in FIG. 2, to be described more fully hereinafter. When neither subscriber is communicating with the other, the apparatus 1 is in a mode designated an "idle" mode.

In the operation of the communication apparatus 1 in its transmit mode, analog speech data of the local subscriber is sampled and stored in a standard sample-and-hold apparatus 9, for example, at a rate of 5–8samples/sec, and converted from analog form to digital form by means of a standard analog-to-digital converter 10. The converted data is then entered into and stored in an input speech buffer 12. The input speech buffer 12 is adapted to store data in sets or frames, for example, sets of N digital samples, and preferably has a capacity of 2N digital samples to allow one set of N samples to be read out of the buffer 12, specifically, to a read buffer 13, while another set of N samples is entered into and stored in the buffer 12. The above-mentioned readout of data from the buffer 12 is controlled by a buffer frame controller 14 which typically includes a counter operable to count the number of samples stored in the input speech buffer 12 and, upon reaching a count of N corresponding to the number of sample in a frame, to cause a set of N samples then in the buffer 12 to be read out of the buffer 12 into the read buffer 13. The data in the read buffer 13 may then be read out therefrom at a rate considerably greater than the input storage rate, for example, at an output rate of 2Mhz. A suitable capacity for the read buffer 13 is N samples, or one frame worth of digital data.

The data read out of the buffer 13 is applied to speech processing apparatus including an energy measurement unit 16, a periodicity detector unit 18 and a speech analysis unit 20. The energy measurement unit 16 operates to measure the energy content of each set or frame of N digital samples stored in the read buffer 113 and to produce an output signal to a signal presence detection logic unit 22 whenever the energy level is above a predetermined threshold value characteristic of human speech. Since it is also possible for certain high-level noise signals to exceed the threshold value of the energy measurement unit 16 and to produce an output signal from the energy measurement unit 16, an additional test of the data read out of the buffer 13 is required to aid in distinguishing between speech signals and noise signals. This additional test is performed by the periodicity detector unit 18 which operates to examine successive sets or frames of N digital samples of data read out of the buffer 13 to detect certain conditions representative of factors or features recurring periodically in, and characteristic of, human speech but not normally present or expected in noise signals. When these recurring periodic factors or features are detected, an output signal is produced by the periodicity detector unit 18 and applied to the signal presence detection logic unit 22. Output signals produced by both the energy measurement unit 16 and the periodicity detector unit 18 accordingly indicate with a very high degree of probability that the data read out of the buffer 13 represents human speech rather than noise. The energy measurement unit 16 and the periodicity detector unit 18 as described hereinabove, while not per se part of the present invention, may be implemented using known circuit elements and techniques. By way of example, the energy measurement unit 16 may be implemented in a digital fashion by arithmetically summing the squares of N samples received from the buffer 13 and producing an output signal whenever the sum exceeds a predetermined value. The periodicity detector unit 16 may be suitably implemented by a pitch extractor, the principles of which are described in the literature, for example, in articles entitled "Average Magnitude Difference Function Pitch Extractor", by Ross et al, IEEE Transactions on Acoustics, Speech and Signal Processing, Vol. ASSP-22, No. 5, Oct. 1974, and "Autocorrelation Type Pitch Extractor" by K. Maezono, The Journal of the Institute of Electrical Communication Engineers of Japan, pp. 1083–1091, Vol 46, No. 8, Aug. 1963.

The abovementioned signal presence detection logic unit 22, which may be implemented by a simple AND-function circuit, operates in response to output signals produced simultaneously by the energy measurement unit 16 and the periodicity detector unit 18, and only when both output signals are simultaneously present, to produce a signal at its output having a predetermined voltage level, for example, a voltage level corresponding to a binary "1". The controller logic unit 7, to be described in greater detail hereinafter, receives the binary "1" voltage signal from the unit 22 and also a signal from a receive signal detection unit 24 indicative of the particular state of the receiver portion 5 of the communication apparatus 1. When the apparatus 1 is in its transmit mode and no voice data is being received by the receiver portion 5, the output signal produced by the unit 24 has a voltage level corresponding to a binary "0". The controller logic unit 7 operates in response to the "1" and "0" signals received thereby from the units 22 and 24, respectively, to produce corresponding "1" and "0" output signals for closing a first switch 25 to allow the data in the read buffer 13 to be further processed for application to an output buffer 28, and also for opening a second switch 30 to insure that the receiver portion 5 of the communication apparatus 1 cannot operate in its receive mode while the transmitter portion 3 operates in its transmit mode. Although the switches 25 and 30 are shown schematically in FIG. 1, they may be readily implemented by standard solid-state switches.

The processing of data stored in the read buffer 13 for application to the output buffer 28 is accomplished by the aforementioned speech analysis unit 20, a delay buffer 32 controlled by a buffer controller 34, and the modulator portion of a modem apparatus 36. The speech analysis unit 20 operates to compress the data read out of the read buffer 13 (e.g., 60K bits/sec) to a rate usable by the modulator portion of the modem apparatus 36 (e.g., 2400 bits/sec). The unit 20, although not per se part of the present invention, may be implemented by a variety of known apparatus, for example, a vocoder, an adaptive predictive coder, or a fourth order linear predictive coder (auto regressive processing). Techniques relative to speech analysis applicable to the present invention are variously described in an article entitled "A Real-Time Adaptive Predictive Coder Using Small Computers," by H. Shaffer et al, Proceedings IEEE Transactions on Communications, Vol. COM-23, No. 12, pp. 1443-1451, December 1975, and also in U.S. Pat. No. 3,681,530, issued Aug. 1, 1972 to H. Shaffer et al.

The delay buffer 32 is employed to receive and store the data processed by the speech analysis unit 20 and, in accordance with the present invention, is arranged to have a capacity to store simultaneously several successive frames of data, for example, 8 frames, with the frames of data being read out therefrom in succession in a first-in first-out manner. The buffer 32 may be implemented by an eight-stage delay line so that data entered into the buffer 32 is delayed at the output of the buffer 32 by a time equal to eight frames. For a typical frame time of 25 msec, the delay introduced by the buffer 32 is 8 × 25 msec, or 200 msec. The readout of the data stored in the buffer 32 is accomplished by the aforementioned buffer controller 34 which may be implemented by a modulo-8 counter which counts from 0 to 7 (a total of eight counts, the number of frames) and reads out a frame of data to the modem apparatus 36 during each count.

The abovementioned 200 msec time delay period of the buffer 32 is employed in accordance with the invention to compensate for inherent delays in the real-time detection of speech data by the energy measurement unit 16 and the periodicity unit 18. Since the detection of a speech signal usually occurs after the fact, the 200 msec delay provided by the delay buffer 32 establishes a time period within which the detection of the speech signal may take place without the loss of speech to the remote subscriber, especially rapid utterances or the onset of speech. By way of example, it has been experimentally demonstrated that without the delay or buffering provided by the buffer 32, such conventional spoken words as "yes" or "no" will be received by the remote subscribe or listener as "es" and "o", respectively. The failure to detect the consonants "y" and "n" in the above example thereby can have the result of either confusing the listener or requiring the listener to request the speaker to repeat his spoken words once he is able to gain control of the transmission line or channel.

The data read out of the delay buffer 32 and applied to the modulator portion of the modem apparatus 36 as described hereinabove is processed by the modem apparatus 36 to match the data to the telephone network and then applied to and stored in a read buffer 37. The data in the read buffer 37 is read out therefrom at a rapid rate, for example 2Mhz, and then applied to the output buffer 28 from which it is then read out therefrom at a much lower rate compatible with the telephone network, for example, at a rate of 5-8 Khz. The data read out from the output buffer 28 is applied to the telephone network and transmitted to the remote subscriber for processing at the remote subscriber location for use by the subscriber at that location.

Figure 2:
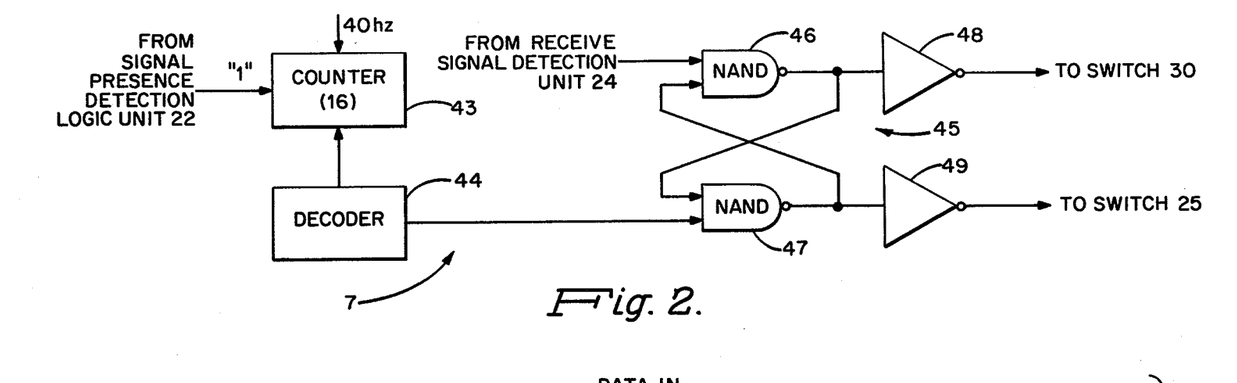
FIG. 2 is a detailed block diagram of a controller logic unit employed in the half-duplex communication apparatus of FIG. 1.

The communication apparatus 1 as described hereinabove further includes apparatus for providing, in addition to the delay (e.g., 200 msec) provided by the delay buffer 32, a further delay or holdover period (e.g., 200 msec) to prevent the transmission line or channel from being switched from the local subscriber to the remote subscriber during normal pauses as occur during normal speech. This additional delay or holdover period is provided by the controller logic unit 7 at such time as the logic unit 22 produces an output signal (binary "1" signal) simultaneously with the receive signal detection unit 24 producing an output signal (binary "0" signal) indicating that no data is being received by the receiver portion 5 of the apparatus 1. As indicated in FIG. 2, the "1" signal from the unit 22 is applied to a counter 43 which is arranged to be set by the "1" signal to a specified count, for example, a count of 16. The counter 43 remains at this count until the signal from the unit 22 changes from "1" to "0", for example, during a pause in speech. When this change occurs, the counter 43 is decremented at the frame rate, for example, 40 Hz. For the aforementioned frame time of 25 msec, the time required to reduce the count in the counter 43 from 16 to 0 is 16 × 25 msec, or 400 msec. Of this 400 msec time period, one half, or 200 msec, is coincident with the 200 msec delay of the delay buffer 32, with the remaining 200 msec time period representing the holdover time period. As the decrementing of the counter 43 takes place, a decoder 44, which is arranged to detect the 0 count of the counter 43, produces an output signal of a binary "1" level which is applied, together with the "0" signal from the receive signal detection unit 24, to a latch circuit 45. The latch circuit 45, which includes a pair of cross-connected NAND-function gates 46 and 47 with inverters 48 and 49 at their respective outputs, operates in response to the aforementioned "1" and "0" signals from the decoder 44 and the unit 24, to produce "0" and "1" signals at the outputs of the inverters 48 and 49, respectively. The "0" and "1" signals are respectively applied to the switches 30 and 25, causing the switch 25 to be closed and the switch 30 to be opened, as previously described. At such time as the count of the counter 43 reaches 0, the output signal of the decoder 44 switches to a second level (e.g., a binary "0"), causing the output of the inverter 49 to switch to a "0" level. The "0" output of the inverter 49 operates to re-open the switch 25 to establish the idle mode for the apparatus 1 thereby allowing the transmission line or channel to be switched over to the remote subscriber. Thus, a first delay of 200 msec is provided by the delay buffer 32 to prevent the loss of speech, as previously described, and an additional delay or holdover of 200 mesc is provided by the controller logic unit 7 to prevent the transmission line or channel from being switched over to the remote subscriber during a normal pause in the conversation or speech of the local subscriber. The aforementioned total time period of 400 msec has been determined experimentally to be sufficient to prevent the switching over or transfer of the transmission line from one subscriber to another subscriber during a normal pause in speech.

At such time as digital voice data is to be received by the local subscriber from the remote subscriber, for example, in response to the transmission line or channel being switched from the local subscriber to the remote subscriber as described hereinabove, the aforementioned receiver portion 5 of the communication apparatus 1 is employed to process this data for use by the local subscriber. The data received over the transmission network is applied to and stored in an input buffer 50 and then read out therefrom under the control of a buffer frame controller 52. The frame controller 52 is of the same form as the aforedescribed buffer frame controller 14. The presence of data in the input buffer 50 is detected by the aforementioned receive signal detection unit 24, for example, by detecting a particular coded portion of the modulated data received by the input buffer 50. The detection by the unit 24 of the data in the buffer 50 causes the output of the unit 24 to change from its previously described "0" level to a "1" level. As a result, the output of the inverter 48 (FIG. 2) changes to a "1", causing the switch 30 to be closed. The switch 25 is open at this time by virtue of the "0" output of the inverter 49. Thus, any attempt by the local subscriber to talk with the remote subscriber while the receiver portion 5 of the apparatus 1 is in use and the switch 30 closed is thwarted by the open condition of the switch 25. In this latter case, the local subscriber quickly learns that he must wait until the remote subscriber has relinquished the transmission line, that is, at the termination of the talking by the remote subscriber, before he can speak again to the remote subscriber.

With the apparatus 1 in its receive mode and the switch 30 closed as described above, the data read out of the input buffer 50 is applied to the demodulator portion of the aforementioned modem apparatus 36 and processed thereby to match the transmission line to the subscriber apparatus. The data processed by the demodulator portion of the modem apparatus 36 is applied to a speech synthesis unit 55 wherein the data (2400 bits/sec) is used to synthesize an approximate replica of the original speech waveform from the remote subscriber. The speech synthesis unit 55 thus is functionally the inverse of the aforedescribed speech analysis unit 20 and may be structually implemented by the inverse of the speech analysis unit 20. That is, if the speech analysis unit 20 is implemented by a fourth order linear predictive coder, the speech synthesis unit 55 may be implemented by a fourth order linear predictive synthesizer.

The data processed by the speech synthesis unit 55 is applied to a speech output buffer 57 from which it is then read out at a frequency of 5–8 Khz to a digital-to-analog converter 59. The converter 59 operates to convert the digital signals from the buffer 57 to analog signals which are then applied to the subscriber apparaus in the form of audible signals.

Although the communication apparatus 1 has been described hereinabove in a hardware context, it is to be appreciated that there may exist applications in which a sofware approach may be preferred. In this case, the functions of the various block units as described hereinabove may be implemented by a programmed computer in which the various components of the computer are interconnected by the program to perform the functions of the black boxes shown in FIGS. 1 and 2. Any high-speed programmable digital computer capable of processing speech algorithms in real time may be used for the above purpose.

Figure 3:
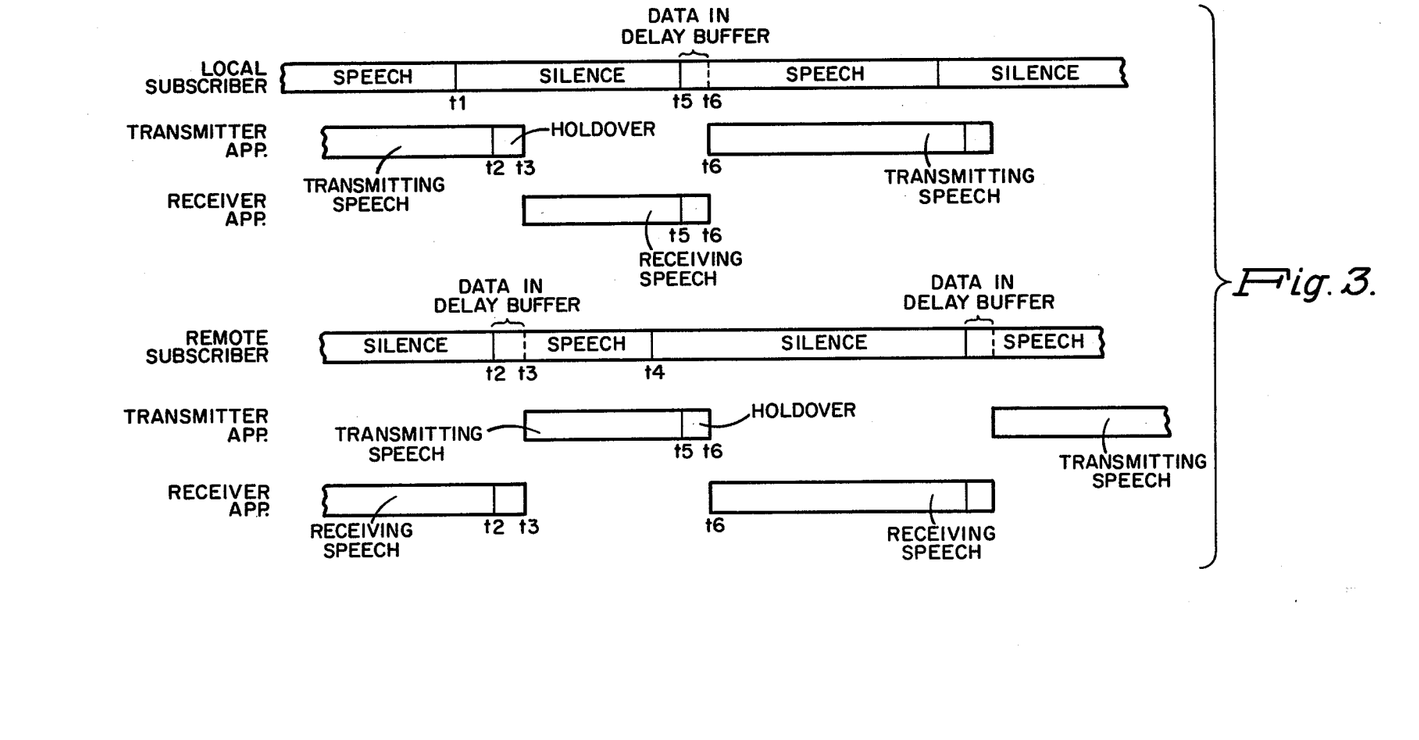
FIG. 3 illustrates an example of a typical communication between subscribers in accordance with the invention.

Referring now to FIG. 3, there is illustrated an example of a typical communication between a first (local) subscriber and a second (remote) subscriber. In the example, the local subscriber is shown as talking until a time $t1$ which is followed by a period of silence. As the local subscriber talks, his transmitter apparaus is on and transmitting to the remote subscriber although the processed speech data of the local subscriber is delayed in the delay buffer 32 for a period equal to a time $t2$ minus the time $t1$ (i.e., 8 frames). The receiver apparatus of the remote subscriber is on at this time, permitting the remote subscriber to listen to the speech of the local subscriber. Since the transmitter apparatus of the remote subscriber is off at this time, the remote subscriber is unable to talk so as to be heard by the local subscriber. At such time as the remote subscriber no longer hears the speech of the local subscriber, as at time $t2$, the remote subscriber is able to commence speaking. However, the transmitter apparatus of the local subscriber remains on and the receiver apparatus remains off due to the holdover period provided by the controller logic unit 7. Only after this holdover period, at time $t3$, is the transmitter apparatus of the local subscriber turned off and the receiver apparatus turned on, these changes occurring automatically at the time $t3$.

At the remote subscriber location, the transmitter apparatus is turned on at the time $t3$, due to the delay ($t3$-$t2$) provided by the delay buffer at that location, and the receiver apparatus is turned off, following the holdover period provided by the controller logic unit at that location. At a time $t4$, the remote subscriber stops talking and, at a time $t5$, after the delay ($t5$-$4$) provided by the delay buffer at that location, the local subscriber is able once again to commence speaking. However, the transmitter apparatus of the remote subscriber does not turn off and the receiver apparatus does not turn on until the termination of the holdover period at a time $t6$. At the local subscriber location, the transmitter apparatus does not turn on until the remote transmitter apparatus turns off at time t6. The abovedescribed operations continue in the general manner indicated in FIG. 3.

From the above discussion, it will be noted that each subscriber is able to talk as soon as he notes that the other subscriber is no longer talking. Neither subscriber is therefore aware of any delays in the system. The delays provided by the delay buffers compensate for the inherent delays in the real time detection of speech data and insure that the onset of speech, as at times $t2$ (remote subscriber) and $t5$ (local subscriber) is always stored in the buffers and, therefore not lost to either subscriber. The holdover periods insure that the transmitting apparatus and receiving apparatus of the subscribers remain in their required states during normal pauses in speech and are not switched to opposite states during these normal pauses.

While there has been described what is considered a preferred embodiment of the invention it will be apparent to those skilled in the art that various changes and modifications may be made therein without departing from the invention as called for in the appended claims.

What is claimed is:

1. Communication apparatus for bidirectional communication over a transmission network comprising:
   a first, local source of digital data representative of speech;
   real-time processing means coupled to the first source of data and operative to detect and examine in real time the data from the first source and to produce an output signal when the data is determined to represent voice data as opposed to noise;
   modulator means;
   speech analysis means coupled to the first source of digital data and operative to compress the data from the first source to a rate usable by the modulator means;
   delay means coupled to the speech analysis means and to the modulator means and operative to delay the data from the speech analysis means by a predetermined amount and to apply the delayed data to the modulator means, the amount of the delay provided by the delay means being selected to compensate for delays inherent in the detection of data by the real-time processing means;

said modulator means being operable in response to the delayed data received thereby to match the data to the transmission network;

first switch means coupled to the modulator means and having a first operating state during which data from the modulator means may pass therethrough and a second operating state during which data from the modulator means may not pass therethrough;

output means coupled to the first switch means and operative to apply data passing through the first switch means to the transmission network;

a second, remote source of digital data operable to originate and transmit digital data representative of speech over the transmission network;

receiver means adapted to examine data from the second source and operative in the absence of digital data originating with the second source to produce an output signal;

controller means coupled to the real-time processing means, to the receiver means and to the first switch means and operative in response to the output signal produced by the real-time processing means and the output signal produced by the receiver means to cause the first switch means to operate in its first operating state thereby to allow data from the modulator means to be applied via the first switch means to the output means forapplication to the transmission network, said controller means being operative to cause the first switch means to operate in its first operating state for a period of time coincident with and also extending beyond the delay provided by the delay means by an additional amount, and further operative at the cessation of data from the first source and the termination of the output signal of the real-time processing means to cause the first switch means to switch to its second operating state at the termination of said period of time, the duration of said period of time being selected to prevent the first switch means from switching to its second operating state during a pause in the speech data from the first source.

2. Communication apparatus in accordance with claim 1 wherein the real-time processing means comprises:

energy measurement means coupled to the first source of data operative to measure the energy content of successive portions of the data from the first source and to produce an output signal whenever the energy level is above a predetermined threshold value characteristic of speech;

periodicity detector means coupled to the first source of data operative to examine successive portions of the data from the first source to detect conditions representative of factors recurring periodically in, and characteristic of, speech and to produce an output signal whenever such conditions are detected; and signal presence detection means coupled to the energy measurement means and to the periodicity detector means and operative when output signals are produced simultaneously by the energy measurement means and the periodicity detector means to produce an output signal to the controller means.

3. Communication apparatus in accordance with claim 2 wherein the controller means comprises:

counter circuit means operative in response to each output signal produced by the signal presence detection means to be set to a predetermined first count and thereupon operable to be stepped from said first count toward a predetermined second count, the time required to step the counter circuit means from the first count to the second count being established to be related to the delay provided by the delay means and the aforesaid additional delay beyond the delay provided by the delay means;

count examining means coupled to the counter circuit means and operative to examine the counts of the counter circuit means and to produce a first output signal when the count is other than the predetermined second count and to produce a second output signal when the count in the counter circuit means is equal to the predetermined second count; and circuit means coupled to the count examining means to the first switch means and to the receiver means and operative in response to the output signal produced by the receiver means and in response to the first output signal produced by the count examining means to cause the first switch means to operate in its first operating state, and operative in response to the second output signal produced by the count examining means to cause the first switch means to operate in its second operating state.

4. Communication apparatus in accordance with claim 1 wherein the receiver means comprises:

input storage means for receiving and storing data originating with the second source; and receive signal detection means coupled to the input storage means and operative to examine the contents of the input storage means and to produce an output signal to the controller means in the absence of data in the input storage means originating with the second source.

5. Communication apparatus in accordance with claim 4 wherein:

the receive signal detection means is further operative in response to the presence of data in the input storage means originating with the second source to produce a second output signal to the controller means;

said receiver means further comprising:

second switch means coupled to the input storage means and to the controller means and having a first operating state during which data stored in the input storage means may pass therethrough and a second operating state during which data stored in the input storage means may not pass therethrough;

said controller means being operative in response to the second utput signal produced by the receive signal detection means to cause the second switch means to operate in its first operating state thereby to allow data stored in the input storage means to pass therethrough and further operative to cause the first switch means to operate in its second operating state thereby to prevent data originating with the first source from being applied to the output means; and means coupled to the second switch means and operative to convert data passing through the second switch means to a speech format for use by the first source of data.

6. Communication apparatus in accordance with claim 5 wherein the real-time processing means comprises:
energy measurement means coupled to the first source of data and operative to measure the energy content of successive portions of the data from the first source and to produce an output signal whenever the energy level is above a predetermined threshold value characteristic of speech;
periodicity detector means coupled to the first source of data and operative to examine successive portions of the data from the first source to detect conditions representative of factors recurring periodically in, and characteristic of, speech and to produce an output signal whenever such conditions are detected; and
signal presence detection means coupled to the energy measurement means and to the periodicity detector means and operative when output signals are produced simultaneously by the energy measurement means and the periodicity detector means to produce an output signal to the controller means.

7. Communication apparatus in accordance with claim 6 wherein the controller means comprises:
counter circuit means operative in response to each output signal produced by the signal presence detection means to be set to a predetermined first count and thereupon operable to be stepped from said first count toward a predetermined second count, the time required to step the counter circuit means from the first count to the second count being established to be related to the delay provided by the delay means and the aforesaid additional delay beyond the delay provided by the delay means;
count examining means coupled to the counter circuit means and operative to examine the counts of the counter circuit means and to produce a first output signal when the count is other than the predetermined second count and to produce a second output signal when the count in the counter circuit means is equal to the predetermined second count; and
circuit means coupled to the count examining means, to the first switch means and to the receiver means and operative in response to the first output signal produced by the receiver means and in response to the first output signal produced by the count examining means to cause the first switch means to operate in its first operating state, and operative in response to the second output signal produced by the count examining means to cause the first switch means to operate in its second operating state.

8. Half-duplex telephone communication apparatus for enabling a first subscriber to engage in speech communication with a second subscriber over a telephone network, said communication apparatus comprising:
first means operative to convert analog speech of the first subscriber to digital data format;
real-time processing means coupled to the first means and operative to detect and examine in real time the digital data from the first means and to produce an output signal when the data is determined to correspond to voice data as opposed to noise;
modulator means;
speech analysis means coupled to the first means and operative to receive the data from the first means and to compress the data to a rate usable by the modulator means;
delay means coupled to the speech analysis means and to the modulator means and operative to delay the data from the speech analysis means by a predetermined amount and to apply the delayed data to the modulator means, the amount of the delay provided by the delay means being selected to compensate for delays inherent in the detection of data by the real-time processing means;
said modulator means being operable in response to the delayed data received thereby to match the data to the telephone network;
first switch means coupled to the modulator means and having a first operating state during which data from the modulator means may pass therethrough and a second operating state during which data from the modulator means may not pass therethrough;
output means coupled to the first switch means and operative to apply data received from the first switch means to the telephone network;
receiver means operable in the absence of digital speech data originating with the second subscriber to produce an output signal; and
controller means coupled to the real-time processing means, to the receiver means and to the first switch means and operative in response to the output signal produced by the real-time processing means and the output signal produced by the receiver means to cause the first switch means to operate in its first operating state thereby to allow data from the modulator means to be applied via the first switch means to the output means for application to the telephone network, said controller means being operative to cause the first switch means to operate in its first operating state for a period of time coincident with and also extending beyond the delay provided by the delay means by an additional amount, and further operative at the cessation of speech by the first subscriber and the termination of the output signal by the real-time processing means to cause the first switch means to switch to its second operating state at the termination of said period of time, the duration of said period of time being selected to prevent the first switch means from switching from its first operating state to its second operating state during a pause in the speech data of the first subscriber corresponding to and representative of a pause in the speech of the first subscriber.

9. Half-duplex telephone communication apparatus in accordance with claim 8 wherein the real-time processing means comprises:
energy measurement means coupled to the first means and operative to measure the energy content of successive portions of the data from the first means and to produce an output signal whenever the energy level is above a predetermined threshold value characteristic of speech;
periodicity detector means coupled to the first means and operative to examine successive portions of the data from the first means to detect conditions representative of factors recurring periodically in, and characteristic of, speech and to produce an output signal whenever such conditions are detected; and signal presence detection means coupled to the energy measurement means and to the periodicity detector means and operative when output signals are produced simultaneously by the energy measurement means and the periodicity detector means to produce an output signal to the controller means.

10. Half-duplex telephone communication apparatus in accordance with claim 9 wherein the controller means comprises:

counter circuit means operative in response to each output signal produced by the signal presence detection means to be set to a predetermined first count and thereupon operable to be stepped from said first count toward a predetermined second count, the time required to step the counter circuit means from the first count to the second count being established to be related to the delay provided by the delay means and the aforesaid additional delay beyond the delay provided by the delay means;

count examining means coupled to the counter circuit means and operative to examine the counts of the counter circuit means and to produce a first output signal when the count of the counter circuit means is other than the predetermined second count and to produce a second output signal when the count of the counter circuit means is equal to the predetermined second count; and circuit means coupled to the count examining means, to the first switch means and to the receiver means and operative in response to the output signal produced by the receiver means and in response to the first output signal produced by the count examining means to cause the first switch means to operate in its first operating state, and operative in response to the second output signal produced by the count examining means to cause the first switch means to operate in its second operating state.

11. Half-duplex telephone communication apparatus in accordance with claim 10 wherein the first means comprises:

sampling means operative to sample analog speech of the first subscriber;

analog-to-digital converter means coupled to the sampling means and operative to convert each analog sample of the sampling means to a digital data format; and buffer storage means coupled to the analog-to-digital converter means and operative to receive and store therein the digital data from the analog-to-digital converter means.

12. Half-duplex telephone communication apparatus in accordance with claim 8 wherein the receiver means comprises:

input storage means for receiving and storing data originating with the second subscriber; and receive signal detection means coupled to the input storage means and operative to examine the contents of the input storage means and to produce an output signal to the controller means in the absence of data in the input storage means originating with the second subscriber.

13. Half-duplex telephone communication apparatus in accordance with claim 12 wherein:

the receive signal detection means is further operative in response to the presence of data in the input storage means originating with the second subscriber to produce a second output signal to the controller means;

said receiver means further comprising:

second switch means coupled to the input storage means and to the controller means and having a first operating state during which data stored in the input storage means may pass therethrough and a second operating state during which data stored in the input storage means may not pass therethrough;

said controller means being operative in response to the second output signal produced by the receive signal detection means of the receiver means to cause the second switch means to operate in its first operating state thereby to allow data stored in the input storae means to pass therethrough and further operative to cause the first switch means to operate in its second operating state thereby to prevent data originating with the first subscriber from being applied to the output means; and means coupled to the second switch means and operative to convert data passing through the second switch means to audible speech for use by the first subscriber.

14. Half-duplex telephone communication apparatus in accordance with claim 13 wherein the real-time processing means comprises:

energy measurement means coupled to the first means and operative to measure the energy content of successive portions of the data from the first means and to produce an output signal whenever the energy level is above a predetermined threshold value characteristic of speech;

periodicity detector means coupled to the first means and operative to examine successive portions of the data from the first means to detect conditions representative of factors recurring periodically in, and characteristic of, speech and to produce an output signal whenever such conditions are detected; and signal presence detection means coupled to the energy measurement means and to the periodicity detector means and operative when output signals are produced simultaneously by the energy measurement means and the periodicity detector means to produce an output signal to the controller means.

15. Half-duplex telephone communication apparatus in accordance with claim 14 wherein the controller means comprises:

counter circuit means operative in response to each output signal produced by the signal presence detection means to be set to a predetermined first count and thereupon operable to be stepped from said first count toward a predetermined second count, the time required to step the counter circuit means from the first count to the second count being established to be related to the delay provided by the delay means and the aforesaid additional delay beyond the delay provided by the delay means;

decoder means coupled to the counter circuit means and operative to examine the counts of the counter circuit means and to cause the first switch means to produce a first output signal when the count of the counter circuit means is other than the predetermined second count and to produce a second output signal when the count of the counter circuit means is equal to the predetermined second count; and circuit means coupled to the decoder means, to the first switch means and to the receive signal detection means and operative in response to the first output signal produced by the receive signal detection means and in response to the first output signal produced by the decoder means to cause the first switch means to operate in its first operating state, and operative in response to the second output signal produced by the decoder means to cause the first switch means to operate in its second operating state.

* * * * *